United States Patent

[11] 3,596,847

[72] Inventor Arnold G. Peterson
  Sunderland, Mass.
[21] Appl. No. 885,905
[22] Filed Dec. 17, 1969
[45] Patented Aug. 3, 1971
[73] Assignee J. P. Stevens & Co., Inc.
  New York, N.Y.

[54] AIR MANDREL
  4 Claims, 3 Drawing Figs.
[52] U.S. Cl. ................................................. 242/72,
  242/46.2
[51] Int. Cl. ....................................... B65h 75/24,
  B65h 75/30
[50] Field of Search ........................................... 242/72 B,
  72, 72.1, 46.2, 46.3, 68.2

[56] References Cited
UNITED STATES PATENTS
1,975,743 10/1934 Gollong ........................ 242/46.2 X
3,053,467 9/1962 Gidge ........................... 242/72 B
3,197,153 7/1965 Davidson ...................... 242/72 R Primary Examiner—George F. Mautz
Assistant Examiner—Gregory A. Walters
Attorneys—Robert Ames Norton, Michael T. Frimer and Saul Leitner ABSTRACT: An expansible mandrel is provided with a splined hollow shaft having perforations and connected to a source of compressed air. Around the shaft is an elastomeric sleeve, notched where it crosses a spline, which when air is introduced between the splines, expands, gripping any tube, such as the tube on which a roll of paper is wound. As the splined shaft is connected to the caps at both ends of the elastomeric sleeve, the latter is not subjected to torsional strains in use.

PATENTED AUG 3 1971 3,596,847

INVENTOR.
ARNOLD G. PETERSON
BY
Robert Ames Norton
ATTORNEY

AIR MANDREL

BACKGROUND OF THE INVENTION

Expansible mandrels are known, for example, one in which a rubber sleeve is compressed from the ends to expand or a sleeve is connected to caps at its end and compressed air introduced through a central hollow shaft. This latter operates satisfactorily when new, but under extended usage the torsional strains resulting from the two caps being connected to the ends of the sleeve tend to weaken the sleeve and a short life results.

SUMMARY OF THE INVENTION

According to the present invention an expansible mandrel comprises a hollow shaft with splines surrounded with an elastomeric sleeve, sealed at both ends, the sleeve being notched internally where it crosses a spline. When compressed air is introduced through perforations in the hollow shaft at one or more positions, the elastomeric sleeve expands but does not move far enough so that the notched portions expand beyond the splines. In other words, even when expanded a portion of the shoulder of each notch is in contact with the spline and therefore transmits driving force and eliminates torsional stresses in the sleeve. Since the splined hollow shaft or tube is locked to the driving end caps, it transmits the torsional strain through the shoulders of the notches of the elastomeric sleeve, as has been described. As there are no torsional strains on the sleeve itself it cannot twist and has a long life as compared to sleeves which are attached only on the ends to driving caps. Long life is assured, and requirements for air pressure are at a minimum because the air pressure merely is required to bring the portions of the elastomeric sleeve into contact with the tube of a paper roll or other material to be driven.

DESCRIPTION OF THE PREFERRED EMBODIMENTS

Figure 2:
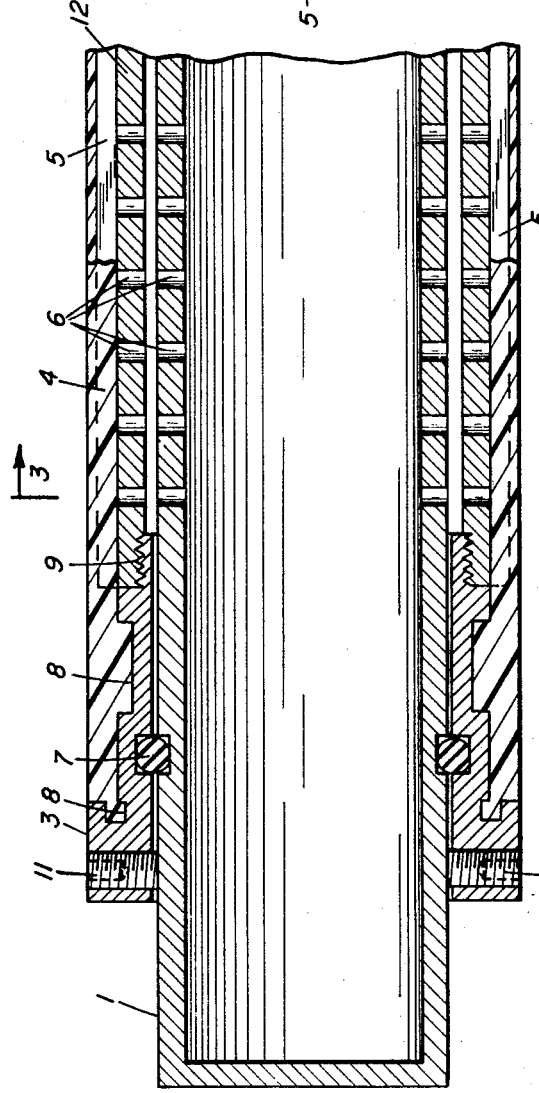
FIG. 2 is a section through the central shaft along the line 2—2.
Figure 1:
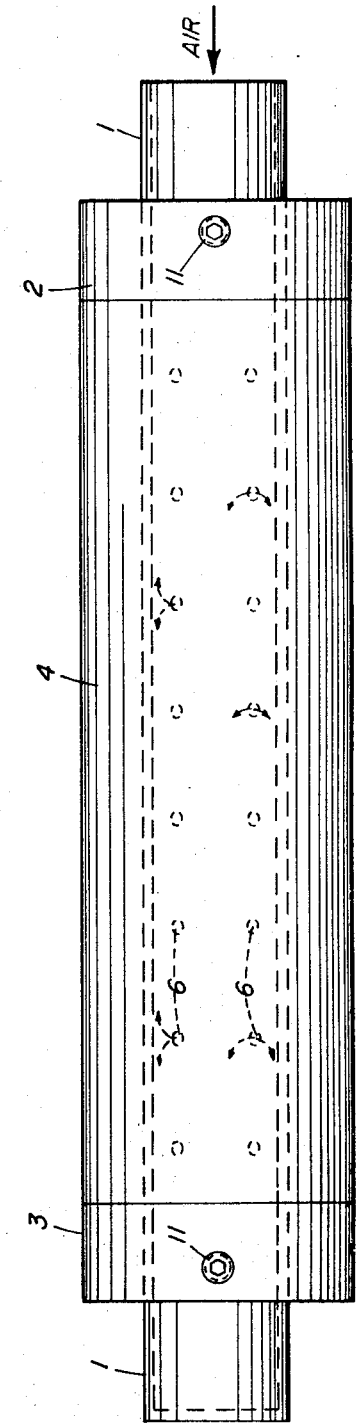
FIG. 1 is a longitudinal elevation of the hollow shaft and the elastomeric sleeve.

FIG. 1 shows the hollow shaft 1, which is connected to a source of compressed air. Attached to the shaft are two caps 2 and 3 locked to the shaft 1 by the recessed head screws 11 and between which caps an elastomeric sleeve 4 of polyurethane extends. A splined shaft 12 with splines 5 is locked to the driving caps 2 and 3 by a threaded connection 9. The splined shaft 12 is spaced slightly from the hollow shaft 1 and both shafts are provided with perforations 6, at one or more positions, through which compressed air from the hollow shaft can flow. Hermetic sealing between the two shafts is provided by the O-ring 7. This structure can best be seen in FIG. 2, although the splines 5 are more clearly shown in FIG. 3. In FIG. 2 only one end of the shafts 1 and 12 is shown with its driving cap 3, and one pair of splines 5 are shown partially broken away. The cap 3 is provided with two grooves 8 into which a polyurethane sleeve 4 extends. The sleeve 4 is initially cast on the splined shaft 12 with the cap 3 already screwed in. The construction is, of course, repeated at the other end at cap 2.

Figure 3:
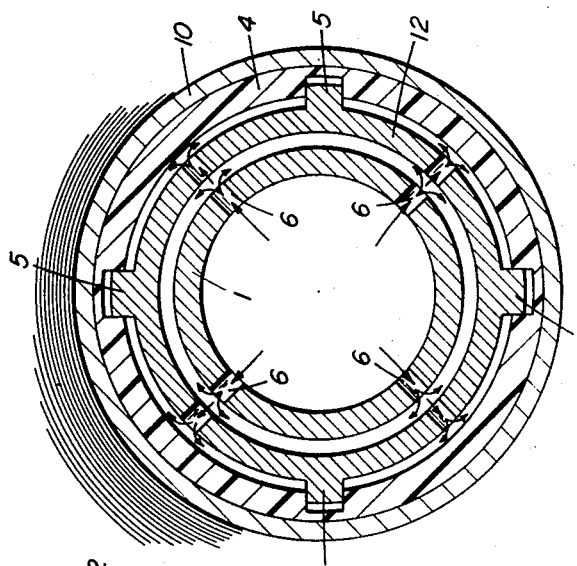
FIG. 3 is a cross section through the mandrel along the line 3—3.

The sleeve 4 extends the full length between caps and where it passes over the splines is notched, as can be best seen in FIG. 3. The portions of the sleeve 4 between splines are substantially in contact with the surface of the splined shaft 12, as can be seen in FIG. 2. When, however, compressed air is introduced, it passes out through the perforations 6 and causes the sleeve 4 to expand slightly, gripping a tube 10 which is to be driven. In FIG. 3 this tube is typically shown as being a center tube of a roll of paper, which is indicated at one side diagrammatically. FIG. 3 exaggerates somewhat the height of the splines 5 as compared to the diameter of the shaft 12. Typically the splines may extend about one-fourth of an inch and when compressed air is introduced the sleeve moves up a much smaller amount, for example one-sixteenth of an inch. This results in the shoulders of the notches in the sleeve 4 still contacting the splines through most of the spline height, as is shown in FIG. 3. While spline height is exaggerated in comparison to spline diameter in this figure, the relative size of splines and amount by which the sleeve 4 is expanded are substantially in proportion. As the shoulders of the notches in the polyurethane sleeve 4 are in contact with the edges of the splines 5, torsional drive is transmitted by the splines, which extend the full length of the shaft, and there is no torsional stress in the sleeve 4 which would cause it to twist, as was the case in prior constructions. Minimum air pressure can be used as it performs no function of stiffening the sleeve against torsion.

FIG. 3 shows the paper tube 10, on which a roll of paper is wound, as being in contact with and tightly gripped by the polyurethane sleeve 4 when it is expanded as shown in FIG. 3. When there is no pressure, the approximate one-sixteenth of an inch of expansion of the sleeve is not present, and this provides sufficient clearance so that in the unexpanded condition the mandrel can be slid through a tube to be driven or the tube slid over the mandrel, depending on the construction of the driving elements of the mandrel, which are not shown as they are not changed by the present invention.

At the caps the polyurethane sleeve is cast into the grooves 8, which provides for sealing against escape of compressed air through the caps. It is possible to form the hollow inner shaft 1 with an enlarged splined portion, but the provision of a separate splined shaft surrounding it with suitable perforations is simpler and provides drive of the splined shaft through the caps and so is preferred. As far as the expansion of the polyurethane sleeve 4 is concerned, it makes no difference whether there is a separate hollow central shaft or whether this shaft is expanded into a splined portion. It is the splines which perform the new function of the present invention eliminating torsional stresses on the polyurethane sleeve.

In the drawings a number of holes are shown in both the central shaft and the splined shaft. This represents a more or less ideal construction because, of course, the more holes there are the more uniform the air pressure is. However, as far as connection between the hollow central shaft and the splined shaft 12, even a single hole can be used as the compressed air distributes itself between the two shafts. Similarly, only a single set of radial holes are needed in the splined shaft 12. There must, of course, be a hole between each pair of splines in order to force the polyurethane sleeve 4 out uniformly when compressed air is applied. The air distributes itself longitudinally along the splined shaft between the splines even if there is only one hole between each pair of splines. The drawings, however, show a more ideal arrangement with a larger number of sets of peripheral holes.

I claim:

1. An expansible mandrel comprising in combination,
   a. a hollow splined shaft with perforations between splines;
   b. caps surrounding the hollow shaft and locked to the splined portion,
   c. an elastomeric sleeve surrounding the splined portion of the shaft and hermetically sealed to the caps;
   d. means for introducing a compressed gas into the hollow shaft, and
   e. the elastomeric sleeve surrounding the shaft being notched over the splines, the spline height being greater than expansion of the elastomeric sleeve when compressed air is introduced into the shaft, whereby when the sleeve is expanded torsional drive is taken from the splines to the notches thereof.

2. An expansible mandrel according to claim 1 in which a hollow perforated shaft is inside the splined shaft, the means for applying compressed gas being to the central hollow shaft and the central shaft being locked to the caps, which in turn are locked to the hollow splined shaft, whereby both shafts with the caps constitute a unit.

3. An expansible mandrel according to claim 2 in which the elastomeric sleeve is of polyurethane.

4. An expansible mandrel according to claim 1 in which the elastomeric sleeve is of polyurethane.